United States Patent Office 3,526,611
Patented Sept. 1, 1970

3,526,611
SYNTHESIS OF POLYMERIC SCHIFF BASES BY
SCHIFF-BASE EXCHANGE REACTIONS
James E. Webb, Administrator of the National Aeronautics and Space Administration, with respect to an invention of Gaetano F. D'Alelio, Notre Dame, Ind.
No Drawing. Filed Nov. 9, 1966, Ser. No. 593,594
Int. Cl. C08g 9/06
U.S. Cl. 260—72.5
16 Claims

ABSTRACT OF THE DISCLOSURE

Schiff-base polymers having the repeating unit

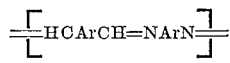

where Ar is an arylene moiety are prepared in tractable, high-molecular-weight form amenable to fabrication into useful articles by Schiff-base exchange reactions in which a difunctional Schiff-base is reacted with an aromatic diamine, an aromatic dialdehyde or another difunctional Schiff base, these reactions being designated "amine exchange," "carbonyl exchange" and "bis exchange," respectively. The polymerization reactions are preferably carried out by heating a mixture of the reactants in a monofunctional Schiff-base, which serves as a reaction medium and moderator. A fusible polymer is obtained by heating to 250° C. to 300° C., and further heating converts the polymer to a black, infusible material having a very high degree of thermal stability.

---

The invention described herein was made in the performance of work under a NASA grant and is subject to the provisions of Section 305 of the National Aeronautics and Space Act of 1958, Public Law 85–568 (72 Stat. 435; 42 U.S.C. 2457).

This invention relates to processes for the synthesis of Schiff-base polymers.

Polymeric Schiff bases of the general formula

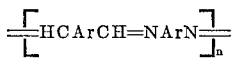

where Ar represents an arylene moiety, exhibit outstanding heat-resistant properties. Polymers having this structure can withstand temperatures in excess of 400° C. for sustained periods without undergoing significant degradation or phase changes. This high degree of thermal stability is believed to result from the conjugated structure of the polymer, the double bond —C=N— linkage characteristics of Schiff bases being alternated with arylene groups. Schiff-base polymers offer an attractive material for applications in the aerospace field as well as for other uses requiring high-temperature stability.

Schiff-base polymers have been prepared previously by a condensation reaction of an aromatic dialdehyde with an aromatic diamine in a solution system, for example, by reaction of terephthaldehyde with p-phenylenediamine in benzene or alcohol. The product of this reaction has been a yellow-to-orange "brick dust" powder having a low molecular weight, approximately that of a dimer. The "brick dust" polymer is an intractable material, infusible and insoluble in most solvents and therefore not amenable to fabrication into useful products. Black polymers should be expected from these reactants if the molecular weight is sufficiently high that conjugation is extensive. It is desired to prepare these polymers in the form of tractable, black, high-molecular-weight material suitable for further processing.

Black Schiff-base polymers have now been prepared by reacting the aromatic diamine and aromatic dialdehyde in a melt system, a mixture of the reagents being heated to a temperature above the melting point. Polymerization to a high molecular weight proceeds very rapidly under these conditions but the reaction is difficult to control and this process does not permit isolation of a tractable, fusible polymer at an intermediate stage. Better control over this reaction has been achieved by use of a molten monofunctional Schiff base such as benzilidine aniline for the reaction medium, the monofunctional Schiff base serving both as a solvent and as a moderator for the reaction. This process is the subject matter of applicant's application Ser. No. 593,595, filed Nov. 9, 1966. A need still exists, however, for an improved process for synthesizing these polymers wherein a tractable, fusible polymer suitable for further processing can be readily obtained.

It is therefore an object of this invention to provide an improved process for synthesizing Schiff-base polymers.

Another object is to provide a process for preparing Schiff-base polymers in a tractable, fusible form suitable for further processing.

Other objects and advantages of the invention will be apparent from the following description.

In the present invention Schiff-base polymers having the formula

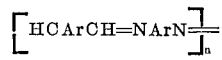

are prepared by reacting difunctional Schiff-bases with an aromatic diamine, an aromatic dialdehyde or another difunctional Schiff-base. These exchange reactions proceed more slowly than the diamine-dialdehyde condensation reaction, and a fusible, tractable black polymer is obtained.

The three Schiff-base exchange reactions included in the present invention are described in detail below under the headings "Amine Exchange," "Carbonyl Exchange," and "Bis Exchange." In each case polymerization is effected by an exchange reaction of a difunctional Schiff base with another difunctional reagent to produce a polymer having repeating units of the formula given above. The structures of the polymers obtained in these three reactions differ only in their end groups, and the resulting polymer properties are substantially the same for each reaction.

AMINE EXCHANGE

In the amine exchange embodiment an aromatic diamine of the formula

where Ar is an arylene moiety is reacted with a difunctional Schiff base of the formula

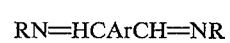

where Ar is an arylene moiety and R is an aryl moiety further described below. The polymerization reaction is postulated to proceed as follows:

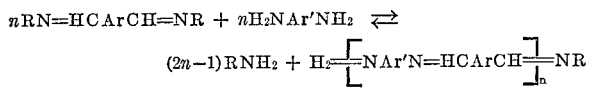

The reaction is reversible, but the equilibrium is shifted by removal of the more volatile byproduct primary amine during heating so as to allow polymerization to a high molecular weight.

The aromatic diamine reactant is represented by the formula $$H_2NArNH_2$$

where Ar is a divalent arylene moiety. The arylene moiety can be a single phenylene ring structure such as m-phenylene, p-phenylene or a phenylene ring having one or two hydrogen atoms substituted by methyl groups; a diphenylene group; or a group consisting of two phenylene rings, linked by one or more heteroatoms or groups such as O, S, $SO_2$, C=O, NH, N—$CH_3$, $C_2H_2$ or $CH_2$ and $SO_2$. Aliphatic chain linkages containing more than one methylene group are excluded from the groups between phenylene rings since the conjugated structure of the polymer backbone, which is critical to thermal stability, would not be attained. In the latter groups the linkages attached to the phenylene rings can be in the meta-meta, para-para or para-meta positions. Illustrative examples of specific amine reactants are p-phenylenediamine, m-phenylenediamine, and the p,p'; p,m'; and m,m', forms of bianiline, diaminodiphenyl methane, diaminodiphenyl oxide, diaminodiphenyl sulfide, diaminodiphenyl sulfone, diaminodiphenyl amine, diaminodiphenyl ethylene and diaminostilbene. Since the thermal stability and other properties of the product polymer are not substantially affected by the particular arylene moiety in the diamine component, the least expensive amine reactant, m-phenylenediamine is preferred.

The difunctional Schiff base in the amine exchange embodiment is represented by the formula $$RN=HCArCH=NR$$

where Ar is an arylene moiety and R is an aryl moiety. Ar can be any of the arylene moieties given above for the amine reactant, and R can be a phenyl tolyl, xylyl, biphenyl, trimethylphenyl, phenoxyphenyl, thiophenoxyphenyl, methoxyphenyl, etc. Illustrative examples of specific Schiff bases included in this formula are p-xylylidenedianiline, m-xylylidenedianiline, di-(p,p'-diformyldiphenylmethane)-aniline,
di-(p,p'-diformyldiphenyloxide)-aniline,
di-(p,p'-diformyldiphenylsulfide)-aniline,
di-(p,p'-diformyldiphenylsulfone)-aniline,
di-(p,p'-diformyldiphenylketone)-aniline,
di-(p,p'-diformyldiphenylethylene)-aniline,
di-(p,p'-diformyldiphenylacetylene)-aniline, etc.

Schiff bases of this type can be prepared by reacting a difunctional aromatic aldehyde, for example, terephthaldehyde, with a monofunctional amine such as aniline.

The amine exchange polymerization reaction can be carried out by solution or melt methods or by a modified melt method using a molten monofunctional Schiff base as the reaction medium. The modified melt method is preferred since the solution method produces a low-molecular-weight polymer, and the melt method is more difficult to control. In each of these methods the diamine and difunctional Schiff base are reacted at equimolar proportions in accordance with the equation given above. A molar excess of either reagent can be used, however, in which case the unreacted excess material is removed from the polymer by volatilization in subsequent heating steps.

In the preferred method the diamine and difunctional Schiff base are mixed with a monofunctional Schiff base, and the mixture is heated to a temperature above its melting point to initiate polymerization. The monofunctional Schiff base serves both as a solvent and as an effective means for moderation and control of the reaction. In addition, this material enters into the polymerization reaction to a limited extent, as evidenced by product yields in excess of 100% based on the weight of the reactants. The monofunctional Schiff base in this reaction is represented by the formula $$RCH=NR$$

where R is an aryl moiety. Examples of aryl moieties included are $C_6H_5$, $CH_3C_6H_4$, $(CH_3)_2C_6H_3$, $(CH_3)_3C_6H_2$, $C_6H_5C_6H_4$
$C_6H_5OC_6H_4$, $C_6H_5SC_6H_4$, $CH_3OC_6H_4$ Benzylidineaniline, $C_6H_5CH=NC_6H_5$, is preferred. The monofunctional Schiff base is preferably provided in the reaction mixture at a weight proportion at least equivalent to the weight of the product, but the proportion is not critical. Higher proportions may result in premature termination of even reversal of the reaction before completion, in which case a portion of the excess is then removed by distillation to achieve the synthesis of the higher molecular weight polymers.

The polymerization reaction is initiated at a temperature only slightly above the melting point of the mixture (about 130° C.). The mixture may be heated rapidly to 250° C. or higher, but preferably it is heated slowly, as for example, at a temperature increase rate of 10° to 30° C. per hour, up to 250° C. to 300° C. The byproduct amine, for example, aniline, is evolved beginning at about 190° C. During the course of this step polymerization proceeds through increasing stages of molecular weight as evidenced by vivid change in color from an initially formed bright yellow-orange to dark brown to black. An equilibrium stage is then reached, and no further polymerization will occur until the monofunctional Schiff base is removed. In order to ensure high molecular weight formation, it is preferred to maintain the reaction mixture at about 250° C. to 300° C. for an extended period of about two to five hours. The product polymer is then recovered by removing the monofunctional Schiff base, preferably by distillation at a temperature of 300° to 350° C. The product, in the form of a glassy, black coherent mass can be polymerized further in the solid state by heating to a temperature not exceeding about 375° C. This treatment serves to improve mechanical properties of the polymer. Unless the final polymer is desired directly, higher temperatures are to be avoided since the polymer would become infusible and intractable. The black fusible polymer is then ground into small fragments or powder for further processing to be described below.

In order to avoid oxidation and side reactions the polymerization reaction and subsequent heating steps are carried out in the absence of moisture and oxygen. An atmosphere of an inert gas such as nitrogen, helium or argon is suitable for this purpose. For this reason and to provide for removal of the byproduct and the monofunctional Schiff base, the reaction is conducted in apparatus provided with distilling equipment and an inert gas inlet. Pressure of the gas over the reaction mixture is not critical, but a substantially reduced pressure, for example, down to 1 mm. Hg is preferred in the later heating stages to enhance removal of volatilized products.

The amine exchange polymerization reaction can also be carried out by a solution method, the diamine and difunctional Schiff base being reacted in an organic solvent. This method produces a yellow-to-brown powdery polymer of low molecular weight, which can be converted to a useful form by a subsequent heat treatment, preferably in the presence of a monofunctional Schiff base.

The diamine and difunctional Schiff base are first dissolved in an inert organic solvent and polymerization is effected by heating under reflux conditions. Examples of organic solvents which may be used are benzene, toluene, ethyl alcohol, dimethylformamide, dibutyl ether, etc., with benzene being preferred. The polymer forms an insoluble precipitate in this method before attaining a high molecular weight, and no further polymerization is obtained after a refluxing period of about one hour. The polymer is readily recovered from the reaction mixture by filtration.

Unlike the "brick dust" polymer obtained by reaction of dialdehydes with diamines in a solution system, the amine exchange solution-derived polymer can be melted and converted to a darker, higher-molecular weight product by heating to a temperature of about 250° to 300° C. However, conversion to the higher-molecular-weight form is preferably carried out by heating the polymer in an excess of a monofunctional Schiff base of the formula given above to a temperature of about 250° C. to 300° C., holding the mixture at this temperature for a period of at least two hours, and then removing the monofunctional Schiff base by distillation. The resulting black polymer is then recovered and converted to finely divided form for further processing.

Amine exchange polymerization can also be carried out by a melt method, a mixture of the reactants being heated to a temperature above the melting point in the absence of any solvent or added material. The reaction is initiated at a temperature of about 130° C. and proceeds readily as the temperature is increased. The reaction mixture may be heated rapidly to about 250° to 350° C. if it is desired to produce an infusible polymer directly. If it is intended to avoid formation an infusible, intractable material, the temperature should be carefully controlled such as by heating to a temperature of 250° to 300° C. at a rate of about 5° to 20° C. per hour and holding at 250° C. to 300° C., preferably for a period of one to four hours. The product polymer, a black, glassy material, is then recovered and converted to finely divided form.

CARBONYL EXCHANGE

The carbonyl exchange embodiment involves the reaction of a difunctional aromatic aldehyde of the formula OHCArCHO where Ar is an arylene group, with a difunctional Schiff base of the formula RCH=NArN=CHR where Ar is an arylene group and R is an aryl group. This reaction is postulated to proceed as follows:

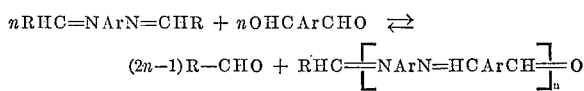

The byproduct in this case is a monofunctional aldehyde which is removed from the reaction mixture during heating in a manner similar to the amine byproduct in the amine exchange reaction.

The aromatic aldehyde reactant is represented by the formula

OHCArCHO where Ar is an arylene moiety. Ar can be any of the groups given above for Ar in the amine reactant for the amine exchange. Examples of specific aldehyde reactants include terephthaldehyde, m-phthaldehyde and the p,p'; p,m'; and m,m' forms of diformyldiphenyl methane, diformyldiphenyl oxide, diformyldiphenyl sulfide, diformyldiphenyl sulfone, diformyldiphenyl ketone, diformyldiphenylmethyl amine, diformyldiphenyl ethylene, di-  formyldiphenylacetylene, etc. The meta and para phthaldehydes are preferred because of their availability and lower cost.

The difunctional Schiff base in the carbonyl exchange embodiment is represented by the formula RCH=NArN=CHR where Ar is an arylene moiety and R is an aryl moiety. Ar and R in this formula can be any of the arylene and aryl moieties, respectively, given above. Examples of specific Schiff bases included are dibenzylidene-p-phenylenediamine, dibenzylidene-m-phenylenediamine, N,N'-bisbenzylidenebenzidene, 4,4'-bis(benzylideneamino) diphenylmethane, 4,4'-bis(benzylideneamino) diphenylether, 4,4'-bis(benzylideneamino) diphenylsulfide, 4,4'-bis(benzylideneamino) diphenylsulfone, 3,7-bis(benzylideneamino) thiaxanthene-5,5-dioxide, 4,4'-bis(benzylideneamino) diphenylamine, etc. Dibenzylidene-m-phenylene diamine is preferred owing to its lower cost and ease of preparation.

The carbonyl exchange reaction can be carried out in substantially the same manner as the amine exchange reaction described above. Solution and melt methods can be used, but the preferred method is to use a monofunctional Schiff base of the formula given above as the reaction medium. In this method the reactants are mixed with an excess of monofunctional Schiff base and the mixture is heated to a temperature above the melting point (about 130° C.) to initiate the reaction. The mixture is then slowly heated to 250° C. to 300° C. and held at this temperature in the same manner as in the amine exchange reaction.

In general the polymers formed by carbonyl exchange undergo the same color changes during the course of heating as amine exchange polymers. The solution method and melt method described above for the amine exchange reaction can also be used, but the solution method produces a low-molecular-weight polymer and the melt method requires careful control of temperature. In some cases, particularly in the solution method, a catalyst may be required to initiate the reaction. A small amount of a Lewis acid such as p-toluenesulfonic acid is suitable for this purpose. The remaining reaction conditions and recovery procedures described for the amine exchange can also be used for this embodiment.

BIS EXCHANGE

In the bis exchange embodiment two difunctional Schiff bases, one having an aromatic diamino moiety and the other having an aromatic dialdehyde moiety, are reacted with one another to produce a Schiff-base polymer and a monofunctional Schiff base. This reaction is postulated to proceed according to the following equation:

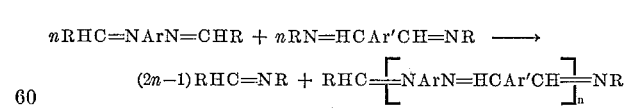

The byproduct monofunctional Schiff base is the same type of compound which is used as the reaction medium and moderator in the amine- and carbonyl-exchange embodiments, and the build up of this compound in the reaction mixture facilitates control over the reaction. The bis exchange reaction proceeds much more slowly than the other reactions, but it can be accelerated in a controlled manner by the addition of a Lewis acid catalyst. This reaction is the most effective with regard to control over polymer properties, and it can be readily interrupted at any point to obtain a polymer with pre-determined characteristics such as fusibility and a molecular weight falling within a given range.

The difunctional Schiff base reactant having a dialdehyde moiety is represented by the formula $$RN=HCArCH=NR$$

where Ar is an arylene moiety and R is an aryl moiety. This is the same reactant as the Schiff base described above for the amine exchange reaction, and the definitions of Ar and R and the specific reactants given above for the amine exchange apply equally to the bis exchange reaction.

The difunctional Schiff base having a diamino moiety is represented by the formula $$RCH=NArN=CHR$$

where Ar is an arylene moiety and R is an aryl moiety. The definitions and specific reactants given above for the Schiff base in the carbonyl exchange reaction likewise apply to the Schiff base in the bis exchange reaction.

The bis exchange polymerization reaction is initiated out by heating a mixture of the two Schiff bases to a temperature above the melting point. The temperature is then increased up to about 250° C. to 300° C. and held in this range for a period of two to six hours or until a black polymer is formed. In the same manner as in the amine- and carbonyl-exchange reactions where a monofunctional Schiff base is used as reaction medium, the bis exchange system reaches an equilibrium, and no further polymerization occurs until the byproduct monofunctional Schiff base is removed by distillation. The product is recovered and heat-treated by the procedure described in detail for the amine exchange reaction.

A monofunctional Schiff base can be used as the reaction medium for the bis exchange reaction in the manner described for the amine- and carbonyl-exchange reactions. This measure is not necessarily for effective control over the reaction, but it can be used to stop polymerization at an intermediate point if desired.

In some cases the bis exchange reaction may proceed at an unduly slow rate so that a catalyst will be required. Lewis acids provided in the reaction medium in a catalytic amount, for example, 0.5 to 1 weight percent, are suitable for this purpose. Examples of Lewis acids which can be used include zinc chloride, aluminum chloride, boron trifluoride, titanium tetrachloride, zirconium tetrachloride, mercuric bromide, cobalt iodide, nickel sulfate, cadmium nitrate, cadmium perchlorate, silicon tetrachloride, arsenic tribromide, antimony pentabromide, bismuth trichloride, tin tetrachloride, trimethylamine hydrochloride, trimethylamine hydrobromide, phosphoric acid, tributylphosphonium chloride and p-toluenesulfonic acid.

The bis exchange reaction can also be conducted by the solution method in the same manner as the amine- and carbonyl-exchange reactions. The product is a yellow, low-molecular-weight polymer, which can be converted to the desired black form by heating in the presence of a monofunctional Schiff base in the manner described above for the solution-derived polymer prepared by amine exchange.

The product polymers obtained by any of the reactions described above can be isolated in the intermediate stages as brittle, black, fusible materials, provided that the temperature above which they become infusible and intractable, about 350° C.–400° C., has not been exceeded in their preparation or the polymers have not been held at this temperature for excessive periods of time. This material has a relatively high molecular weight, estimated to be in excess of 20,000, although the insolubility of the polymer has prevented an exact determination. Upon further heating the polymer undergoes additional polymerization in the solid state and is converted to an infusible, tough solid with excellent high temperature stability and good mechanical properties. Fabrication of the polymer into the desired shape or structure must be carried out while it is in the fusible stage because of intractable nature of the infusible material.

In a preferred fabrication procedure the fusible polymer in finely divided form is compressed into the desired shape in a suitable mold and heated to a temperature of about 400° C. to 600° C. in the presence of a catalytic amount of a Lewis acid of the type described above. Heating at this temperature for a period of at least 5 to 20 minutes is required generally, although longer times are necessary for massive structures. The bulk of any remaining monofunctional Schiff base or reactant monomers are evolved during this treatment. In order to avoid or reduce oxidative degradation, an atmosphere of an inert gas such as nitrogen should be provided during this step. During this treatment, reactant byproducts are formed and they, as well as any remaining amounts of monofunctional Schiff base, are removed by post-heating the molded form in an inert atmosphere at 700° C.–1000° C. for one to four hours or more.

For the fabrication of composite heat shields, for which the Schiff-base polymers are a particularly attractive material, the fusible polymer is intermingled with the other components of the composite, for example, reinforcing fibers of a refractory material such as fiberglass or silica, prior to the final heat treatment.

This invention is illustrated by the following examples. The parts and percentages given are by weight unless otherwise specified. Examples I through V show preparation of Schiff-base polymers by amine exchange; VI through IX, carbonyl exchange; and X through XV, bis exchange.

EXAMPLE I

A mixture of 1.08 parts of p-phenylenediamine and 2.84 parts of p-xylylidenedianil is placed in a reaction flask. The reaction flask, which is equipped with a distilling head, condenser, receiver and capillary for nitrogen inlet, is evacuated and flushed with dry nitrogen, and a nitrogen atmosphere is maintained in the flask. Then the flask is inserted in a Wood's metal bath heated to 130° C. The mixture melts and rapidly changes in color from very pale yellow to dark yellow to orange. After ten minutes the orange melt solidifies and no further melting occurs. The temperature is then increased to 190° C., which temperature is maintained for 45 minutes. The mixture is orange-brown in color at this point. The temperature is then raised to 300° C. at a pressure of 1 to 20 millimeters of mercury, and the system is held under these conditions for four and one-half hours. The system is allowed to cool and 2.0 parts of a dark brown, powdery polymer is recovered. The distillate, 1.5 parts, consists mostly of aniline and a small proportion of p-phenylenediamine.

EXAMPLE II

Using the apparatus of Example I, 1.81 parts of benzylideneaniline is combined with the reaction mixture of Example I. The resulting mixture is heated to 195° C. and held at this temperature for 45 minutes, during which period aniline is distilled from the mixture. The temperature is then increased 210° C. for 10 minutes and the distilled aniline is collected. The system is then heated to remove the benzylideneaniline and the flask is cooled to room temperature. A dark brown, coherent solid product is then recovered at a yield of 107%.

EXAMPLE III

The procedure of Example II is repeated, except that 3.62 parts of benzylideneaniline is used and the heating schedule is modified. The mixture is heated slowly over a period of two hours at 330° C. Initial melting begins at about 100° C. and a homogeneous brown solution is obtained when the temperature reaches 160° C. Distillation of aniline and benzylideneaniline occurs as the temperature is increased within the range of 210° C. to 330° C. The pressure is then reduced to 0.4 mm., and the system is heated at 330° C. to 350° C. for an hour.

A black, coherent solid product is obtained at a yield of 104%.

EXAMPLE IV

A mixture of 2.84 parts of p-xylylenediamil, 1.08 parts p-phenylenediamine and 3 parts benzylideneaniline is heated in the apparatus of the preceding examples under a nitrogen atmosphere according to the following schedule: four hours at 160° C. and atmospheric pressure, fifteen hours at 250° C. and atmospheric pressure, ten hours at 310° C. and atmospheric pressure, fifteen hours at 330° C. and 140 mm., and ten hours at 350° C. and 0.1 mm. The system is then cooled, and 3.79 parts of a black, brittle, shiny solid is recovered. The solid melts when held over a bunsen burner flame. The high yield of product indicates that not all of the benzylideneaniline is removed from the product.

EXAMPLE V

The procedure of Example IV is repeated, except that the mixture is heated at 160° C., 260° C., and 340° C. for four, ten, and ten hours, respectively. The pressure is then reduced to 140 mm. for 12 hours and 0.5 mm. for 10 hours while the temperature is maintained at 340° C. The system is cooled to room temperature, and 2.44 parts of a porous, shiny black solid product is recovered.

EXAMPLE VI

A mixture of 1.34 parts terephthaldehyde and 2.84 parts of dibenzylidene-p-phenylenediamine is heated in the apparatus of Example I using a nitrogen atmosphere. The temperature is increased to 310° C. over a period of 130 minutes at atmospheric pressure. The pressure is then reduced to 3.8 and 0.7 mm., respectively, while the temperature is maintained at 310° C. over an additional period of 140 minutes. The system is allowed to cool to room temperature and 2.26 parts of a reddish-black solid product is recovered.

EXAMPLE VII

A mixture of 1.34 parts of terephthaldehyde, 2.84 parts of dibenzylidene-p-phenylenediamine and 2.0 parts of benzylideneaniline is heated in the apparatus of Example I under a nitrogen atmosphere. The temperature is increased from room temperature to 300° C. over a period of 12 hours at 150 mm. and then is increased to 330° C. The system is then cooled to room temperature, and 0.61 part of a black solid product is recovered.

EXAMPLE VIII

A mixture of 2.84 parts dibenzylidene-p-phenylenediamine, 1.34 parts terephthaldehyde and 3 parts benzylideneaniline is heated under a nitrogen atmosphere at atmospheric pressure for two hours at 160° C., two hours at 200° C., four hours at 260° C., and 10 hours at 320° C. in the apparatus of Example I. The temperature is then maintained at 320° C. for 10 hours at 1 mm. pressure and at 400° C. for 10 hours at 5 mm. pressure. The system is cooled, and 2.51 parts of a porous fusible black solid is recovered.

EXAMPLE IX

A mixture of 2.44 parts of di-(2-pentylidene)-p-phenylenediamine, 1.34 parts of terephthaldehyde and 4 parts benzylideneaniline is heated in the apparatus of Example I under a nitrogen atmosphere. The temperature is increased to 160° C. for 4 hours, and to 270° C. for 10 hours at atmospheric pressure. The pressure is then reduced to 140 mm. for 12 hours and to 0.3 mm. for 10 hours, all at 320° C. The sytsem is cooled, and 3.41 parts of a hard, black solid is recovered.

EXAMPLE X

A mixture of 2.84 parts of dibenzylidene-p-phenylenediamine and 2.84 parts xylylidenedianil is heated in the apparatus of Example I under a nitrogen atmosphere at atmospheric pressure. The mixture melts and turns yellow at 80° C. to 85° C. and proceeds through a series of changes as the temperature is increased as follows: 5 minutes, 130° C., yellow melt; 15 minutes, 170° C., yellow melt; 20 minutes, 245° C., light-red melt; 25 minutes, 265° C., benzilidene-aniline begins to reflux; 30 minutes, 285° C., red melt; 52 minutes, 298° C., reddish-brown viscous melt; 80 minutes, 305° C., dark red-brown, highly viscous melt; 150 minutes, 332° C., reddish-black, highly viscous melt; and 240 minutes, 334° C., dark reddish-black melt. The system pressure is then reduced to 50 mm. and most of the byproduct benzilidene-aniline is collected. The pressure is then reduced to 1.5 to 2.0 mm. and the system is held at 320° C. to 350° C. for eight hours. The system is then cooled, and 2.40 parts of a black, shiny, tough polymer is recovered.

EXAMPLE XI

The procedure of Example X is repeated except that the mixture is heated to 200° C. and then to 300° C. over the course of one hour at atmospheric pressure. The pressure is then reduced to 150 mm. and heating at 300° C. is continued for four hours to remove byproduct benzilidene-aniline. The system is then cooled and 2.4 parts of a hard, black polymer is recovered.

EXAMPLE XII

The procedure of Example XI is repeated except that the m- rather than the p- form of dibenzylidenephenylenediamine is used, and the temperature is held at 300° C. for a period of 35 hours while the pressure is gradually reduced to 2 mm. The product 1.83 parts (38.9% yield) is dark brown in color and contains unreacted reagents.

EXAMPLE XIII

The procedure of Example XII is repeated except that 0.1 part zinc chloride is provided in the mixture, and the mixture is refluxed at atmospheric pressure for two hours at 300° C. The pressure is then reduced to 2 mm. and the byproduct benzylidene-aniline is removed by distillation. The system is cooled, and a reddish-black polymer is recovered at a yield of 72.8%.

EXAMPLE XIV

A mixture of 2.84 parts of p-xylylidenedianil, 2.84 parts benzylidene-p-phenylenediamine and 2.0 parts of benzylidene-aniline is heated to 200° C. in the apparatus of Example I under atmospheric pressure. The temperature is then increased to 300° C. over a period of one hour. The color of the mixture changes from yellow to orange, and no further change occurs upon holding the mixture under these conditions for three hours. The pressure is then reduced to 150 mm. and the benzilidene-aniline is removed by distillation over a period of four hours. The mixture changes in color from orange to brown to black during this period. The mixture is then cooled, and 1.38 parts of a shiny black polymer is recovered.

EXAMPLE XV

A series of polymerization reactions is conducted by the following procedure: 0.05 mole p-xylylidenedianil and 0.05 mole of each of nine difunctional Schiff bases having a difunctional amino moiety are mixed and heated in a reaction tube provided with a nitrogen inlet, a condenser, and a receiver, an aluminum heat sink being used for temperature control. The tube is purged with nitrogen and heated under the following schedule: 2 hours at 200° C., 2 hours at 260° C., and 10 hours at 320° C., all at atmospheric pressure; 20 hours at 380° C. at 1 mm. and 20 hours at 400° C. and 1 mm. The system is then cooled and the polymer recovered in each case. Further details may be seen by reference to the following table.

TABLE 1.—SOME REPRESENTATIVE POLYMERS PREPARED BY SCHIFF-BASE EXCHANGE REACTIONS

| Polymer No. | Schiff-base reactant | Polymer $\left[=N-Z-N=HC\underset{Z}{\phantom{X}}CH=\right]_n$ | Percent yield |
|---|---|---|---|
| 1 | Dibenzylidene-p-phenylenediamine | –⟨⟩– | 109.7 |
| 2 | Dibenzylidene-m-phenylenediamine | –⟨⟩– (meta) | 105.0 |
| 3 | N,N'-bisbenzylidene-benzidene | –⟨⟩–⟨⟩– | 106.4 |
| 4 | 4,4'-bis(benzylideneamino)diphenylmethane | –⟨⟩–CH$_2$–⟨⟩– | 105.4 |
| 5 | 4,4'-bis(benzylideneamino)diphenylether | –⟨⟩–O–⟨⟩– | 110.0 |
| 6 | 4,4'-bis(benzylideneamino)diphenylamine | –⟨⟩–NH–⟨⟩– | 98.3 |
| 7 | 4,4'-bis(benzylideneamino)diphenylsulfide | –⟨⟩–S–⟨⟩– | 100.0 |
| 8 | 4,4'-bis(benzylideneamino)diphenylsulfone | –⟨⟩–SO$_2$–⟨⟩– | 89.6 |
| 9 | 3,7 bis(benzylideneamino) thiaxanthene 5,5 dioxide | –⟨⟩–CH$_2$–⟨⟩– / –⟨⟩–SO$_2$–⟨⟩– | 105.0 |

In each case a black, shiny solid is obtained. Yields in excess of 100% of theory are due to the retention of by-products of the reaction such as benzylidene-aniline which is tenaciously held by the polymer; the excess can be eliminated by prolonged heating of the ground polymer at 300° C.–400° C. or for shorter times at temperatures of 600° C. or higher.

Polymers prepared by this procedure exhibit excellent thermal stability as evidenced by thermogravimetric analysis wherein the weight loss during heating to elevated temperatures is determined.

In each analysis a 10 mg. sample of polymer is ground for 15 seconds in a stainless steel grinding capsule and heated at a rate of 15° C. per minute under a sample gas flow rate of one standard liter per minute, and the cumulative weight loss is recorded. The results obtained for heating under a nitrogen atmosphere are summarized in the following table.

The weight losses shown at 500° C. and 600° C. in the above table are attributed to loss of remaining byproduct monofunctional Schiff base by diffusion rather than to decomposition of the polymer itself.

Weight losses for polymer samples heated in air are given in Table 3.

TABLE 3.—PERCENT WEIGHT LOSS OF POLYMERS PREPARED AT 400° C. WHILE BEING HEATED IN AIR

| Polymer No. | Percent weight loss at ° C. | | | | | |
|---|---|---|---|---|---|---|
| | 200 | 300 | 400 | 500 | 600 | 700 |
| 1 | | 0.0 | 0.0 | 3.2 | 69.0 | 100.0 |
| 2 | | 0.0 | 0.0 | 3.2 | 64.6 | 100.0 |
| 3 | | 0.0 | 0.0 | 0.6 | 16.6 | 96.8 | 100.0 |
| 4 | | | | 12.0 | 94.0 | 100.0 |
| 5 | | | 0.0 | 5.0 | 70.0 | 100.0 |
| 6 | 1.4 | 1.8 | 2.6 | 54.0 | 100.0 | |
| 7 | | | 0.0 | 6.0 | 83.0 | 100.0 |
| 8 | | | 0.0 | 6.4 | 90.4 | 100.0 |
| 9 | 1.2 | 1.2 | 1.2 | 4.6 | 87.0 | 100.0 |

TABLE 2.—PERCENT WEIGHT LOSS OF POLYMERS PREPARED AT 400° C. WHILE BEING HEATED IN NITROGEN

| Polymer No. | Percent weight loss at ° C. | | | | | | | | | | |
|---|---|---|---|---|---|---|---|---|---|---|---|
| | 200 | 300 | 400 | 500 | 600 | 700 | 800 | 900 | 1,000 | 1,100 | 1,176 |
| 1 | | 0.0 | 1.2 | 2.4 | 10.0 | 18.4 | 22.0 | 23.4 | 24.4 | 26.6 | 29.4 |
| 2 | | 0.0 | 0.6 | 0.6 | 9.2 | 14.8 | 18.6 | 20.4 | 21.6 | 25.6 | 28.6 |
| 3 | | 0.0 | 0.4 | 1.2 | 42.0 | 49.6 | 52.0 | 53.4 | 54.4 | 56.0 | 57.0 |
| 4 | 0.0 | 0.4 | 0.9 | 3.6 | 16.6 | 24.2 | 31.4 | 32.6 | 34.8 | 35.8 | 37.4 |
| 5 | 0.0 | 0.2 | 0.5 | 2.0 | 15.4 | 24.0 | 25.4 | 27.4 | 28.6 | 31.6 | 34.4 |
| 6 | 0.0 | 0.8 | 1.2 | 3.2 | 16.4 | 23.0 | 25.6 | 27.0 | 28.8 | 32.0 | 35.4 |
| 7 | 0.0 | 0.0 | 0.6 | 2.4 | 12.6 | 22.2 | 26.4 | 28.4 | 39.0 | 32.4 | 35.0 |
| 8 | 0.0 | 0.4 | 1.2 | 1.8 | 7.0 | 17.4 | 27.6 | 24.0 | 24.8 | 27.0 | 28.6 |
| 9 | 0.0 | 0.6 | 0.8 | 1.6 | 2.4 | 13.2 | 19.4 | 22.4 | 24.2 | 26.6 | 28.8 |

The criticality of the conjugated structure of the polymer in attaining thermal stability is shown by the fact that a similar polymer wherein Z is a nonconjugated group, e.g., (CH$_2$)$_4$, loses 60% of its weight at 500° C. under the same heating conditions.

Samples of polymers 1, 2 and 9 prepared as described above are post-heated in nitrogen at 600° C. for 20 minutes to determine the effect of such treatment on thermal stability. The weight losses of the postheated polymers in nitrogen and air are given in Table 4.

TABLE 4.—PERCENT WEIGHT LOSS OF POLYMERS POSTHEATED TO 600° C. WHILE BEING HEATED IN AIR AND NITROGEN

| Polymer no. | | 200 | 300 | 400 | 500 | 600 | 700 | 800 | 900 | 1,000 | 1,100 | 1,176 |
|---|---|---|---|---|---|---|---|---|---|---|---|---|
| 1 | Air | | | 0.0 | 1.6 | 70.5 | 98.0 | | | | | |
|   | Nitrogen | 0.6 | 1.0 | 1.6 | 1.8 | 2.0 | 4.0 | 7.2 | 8.8 | 10.0 | 12.0 | 14.4 |
| 2 | Air | | | 0.0 | 0.8 | 58.0 | 100.0 | | | | | |
|   | Nitrogen | | | 0.4 | 0.6 | 1.0 | 3.2 | 7.0 | 8.8 | 10.2 | 12.6 | 15.0 |
| 9 | Air | 3.6 | 4.0 | 4.0 | 6.0 | 68.0 | 100.0 | | | | | |
|   | Nitrogen | 1.8 | 2.0 | 2.0 | 2.4 | 2.8 | 4.8 | 9.4 | 2.2 | 13.8 | 14.6 | 18.0 |

Samples of each of the nine polymers, after postheating to 1176° C. in nitrogen, show further improvement in stability in air. The temperatures in degrees centigrade at which each polymer begins to lose weight and at which it loses 20% of its weight, respectively are as follows:

No. 1, 510, 565; No. 2, 430, 560; No. 3, 520, 650; No. 4, 450, 590; No. 5, 520, 620; No. 6, 550, 660; No. 7, 420, 530; No. 8, 480, 620; No. 9, 475, 620.

The thermal stability of these polymers is further demonstrated by differential thermal analyses wherein the heat evolved or absorbed by the sample during heating to elevated temperatures is determined. Samples of these polymers show no significant endotherms, or exotherms, even at temperatures where major weight losses occur. Thus no major phase changes such as softening, melting or other transitions occur, and a high degree of stability of physical and mechanical properties is indicated.

Infrared spectral studies of the above samples before and after heating to 600° C. and higher show a decrease in intensity, but no shift in the position of the carbon-nitrogen double bond absorption up to 700° C. Changes in the intensity of bands in the spectra (a decrease at 690 cm.$^{-1}$ and 1006 cm.$^{-1}$ and an increase at 750 cm.$^{-1}$) are attributed to continuing chain-end coupling and loss of incorporated monofunctional Schiff base during heating.

In addition to their excellent thermal stability, polymers prepared by the process of this invention possess exceptional resistance to damage by ionizing radiation. Polymer samples exposed either in vacuo at 10$^{-6}$ torr or in air to a gamma radiation dosage of 200 megareps from a radioactive cobalt source show little or no difference in properties before and after irradiation and no detectable diminution of thermal stability as a result of irradiation. Solution polymerization of arylene dialdehydes and diamines yields brick dust polymers in which $n$ in the formulas of the polymers described above has a value of about two. In contrast the polymers prepared by the exchange methods of this invention have a value of $n$ that is at least 5; at higher degrees of concentration the value of $n$ probably will exceed 20 and when postheated may be 100 to 1000 or more. In addition, due to the presence of aromatic end groups in the polymers prepared by the exchange processes, and particularly in the polymers prepared by the bis-exchange method, the thermal stability of these polymers in both nitrogen and air is orders of magnitude higher than those prepared by the solution condensation of the corresponding dialdehydes and diamines. The greatly improved thermal stability was unpredictable and entirely unexpected.

What is claimed is:

1. A process for preparation of a polymer consisting essentially of repeating units of the formula

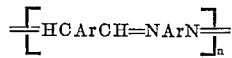

where Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$, C—O, and NH and $n$ is at least 5 which comprises heating a mixture of a first difunctional reagent of the group consisting of an amine of the formula H$_2$NArNH$_2$ where Ar is said arylene moiety and a Schiff base of the formula RHC=NArN=CHR where Ar is said arylene moiety and R is an aryl moiety selected from the class consisting of C$_6$H$_5$, CH$_3$C$_6$H$_4$, (CH$_3$)$_2$C$_6$H$_3$, (CH$_3$)$_3$C$_6$H$_2$, C$_6$H$_5$C$_6$H$_4$, C$_6$H$_5$OC$_6$H$_4$, C$_6$H$_5$SC$_6$H$_4$, and CH$_3$OC$_6$H$_4$, with a second difunctional reagent of the group consisting of an aldehyde having the formula OHCArCHO where Ar is said arylene moiety and a Schiff base of the formula RN=HCArCH=NR where R is said aryl moiety, the reaction of said amine with said aldehyde being excluded.

2. The process of claim 7 wherein said monofunctional Schiff base is benzylidene aniline.

3. The process of claim 10 wherein said monofunctional Schiff base is benzylidene aniline.

4. The process of claim 12 wherein said monofunctional Schiff base is benzylidene aniline.

5. A process for preparation of a fusible, black polymer consisting essentially of repeating units of the formula

where $n$ is at least 5, Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$, C=O, and NH and R is an aryl moiety selected from the class consisting of C$_6$H$_5$,CH$_3$C$_6$H$_4$, (CH$_3$)$_2$C$_6$H$_3$, (CH$_3$)$_3$C$_6$H$_2$, C$_6$H$_5$C$_6$H$_4$, C$_6$H$_5$OC$_6$H$_4$, C$_6$H$_5$SC$_6$H$_4$, and C$_6$H$_5$OC$_6$H$_4$ which comprises heating a mixture of an amine having the formula H$_2$NArNH$_2$ where Ar is said arylene moiety and a Schiff base having the formula RN=HCArCH=NR where Ar is said arylene moiety and R is said aryl moiety to a temperature of 130° C. to 375° C. under an inert atmosphere until a fusible black polymer is obtained and recovering said polymer.

6. The process of claim 5 wherein said mixture is heated in a monofunctional Schiff base having the formula

RCH=NR where R is said aryl moiety.

7. The process of claim 6 wherein said mixture is held at a temperature of about 250° C. to 300° C. for at least one hour under an inert atmosphere and the monofunctional Schiff base is removed therefrom by distillation at a temperature of about 300° C. to 375° C.

8. A process for preparation of a fusible, black polymer consisting essentially of repeating units of the formula

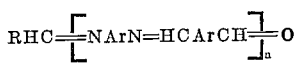

where $n$ is at least 5, Ar is an arylene moiety selected from the class consisting of a phenylene group, a diphenylene group and a group consisting of two phenylene groups linked by a component of the class consisting of O, S, $SO_2$, $CH_2$, $C_2H_2$, $CH_2$ and $SO_2$ N—$CH_3$, C=O, and NH and R is an aryl moiety selected from the class consisting of $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$ and $C_6H_5OC_6H_4$ which comprises heating a mixture of an aldehyde of the formula OHCArCHO where Ar is said arylene moiety and a Schiff base of the formula

where Ar is said arylene moiety and R is said aryl moiety to a temperature of 130° C. to 375° C. under an inert atmosphere until a fusible, black polymer is obtained and recovering said polymer.

9. The process of claim 8 wherein said mixture is heated in a monofunctional Schiff base having the formula RCH=NR where R is said aryl moiety.

10. The process of claim 9 wherein said mixture is held at a temperature of about 250° C. to 300° C. for at least one hour under an inert atmosphere and the monofunctional Schiff base is removed therefrom by distillation at a temperature of about 300° C. to 375° C.

11. A process for preparation of a fusible, black polymer consisting essentially of repeating units of the formula

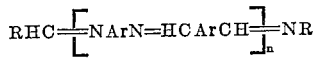

where $n$ is at least 5, Ar is an arylene moiety selected from the class consisting of a phenylene group, a diphenylene group and a group consisting of two phenylene groups linked by a component of the class consisting of O, S, $SO_2$, $CH_2$, $C_2H_2$, $CH_2$ and $SO_2$ N—$CH_3$, C=O, and NH and R is an aryl moiety selected from the class consisting of $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$, and $C_6H_5OC_6H_4$ which comprises heating a mixture of a Schiff base having the formula RN=HCArCH=NR where Ar is said arylene moiety and R is said aryl moiety and a Schiff base having the formula RHC=NArN=CHR where Ar is said arylene moiety and R is said aryl moiety to a temperature of 130° C. to 375° C. under an inert atmosphere until a fusible, black polymer is obtained and recovering said polymer.

12. The process of claim 11 wherein said mixture is heated in a monofunctional Schiff base having the formula

RCH=NR where R is said aryl moiety.

13. The process of claim 12 wherein said mixture is held at a temperature of about 250° C. to 300° C. for at least one hour under an inert atmosphere and the monofunctional Schiff base is removed therefrom by distillation at a temperature of about 300° C. to 375° C.

14. The process of claim 7 wherein the resulting fusible, black polymer is converted to infusible form by heating to a temperature of 400° C. to 600° C. under an inert atmosphere.

15. The process of claim 10 wherein the resulting fusible, black polymer is converted to infusible form by heating to a temperature of 400° C. to 600° C. under an inert atmosphere.

16. The process of claim 13 wherein the resulting fusible black polymer is converted to infusible form by heating to a temperature of 400° C. to 600° C. under an inert atmosphere.

References Cited

UNITED STATES PATENTS 3,198,767  8/1965  Matsuda et al. _____ 260—65

OTHER REFERENCES

"Jour. Polymer Science," Part C, No. 4 (1963), pp. 1305–1313, Topchiev et al.

"Jour. Polymer Science," B2 (1964) pp. 943–946, Stivala et al.

"Makromolekulare Chemie," vol. 84 (1965) pp. 238–249, Danhäuser et al. (pp. 238–240 only needed).

"Jour. American Chem. Soc.," vol. 88 (May 1966) pp. 1943–1947, Manassen et al.

"Makromolekulare Chemie," vol. 56 (1962), pp. 195–199, Akitt et al.

WILLIAM H. SHORT, Primary Examiner

E. WOODBERRY, Assistant Examiner

U.S. Cl. X.R.

260—47, 65